(12) United States Patent
Groothuijse et al.

(10) Patent No.: US 9,340,691 B2
(45) Date of Patent: May 17, 2016

(54) HOT MELT INK COMPOSITION COMPRISING A COPOLYESTER AND PROCESS FOR PREPARING A COPOLYESTER

(71) Applicant: OCE-TECHNOLOGIES B.V., Venlo (NL)

(72) Inventors: Ronald Groothuijse, Sevenum (NL); Richard Van Hameren, Herten (NL); Peter R. Markies, Grubbenvorst (NL); Marjon M. H. Janssen, Beringe (NL); Emile A. Snijders, Waalre (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 77 days.

(21) Appl. No.: 14/142,550

(22) Filed: Dec. 27, 2013

(65) Prior Publication Data

US 2014/0114013 A1    Apr. 24, 2014

Related U.S. Application Data

(63) Continuation of application No. PCT/EP2012/061668, filed on Jun. 19, 2012.

(30) Foreign Application Priority Data

Jun. 30, 2011    (EP) .................................... 11172140

(51) Int. Cl.

| | |
|---|---|
| *C08G 63/16* | (2006.01) |
| *C08G 63/00* | (2006.01) |
| *C08G 63/02* | (2006.01) |
| *C09D 11/34* | (2014.01) |
| *C08G 63/12* | (2006.01) |
| *C09D 167/00* | (2006.01) |
| *C08G 63/80* | (2006.01) |

(52) U.S. Cl.
CPC ................ *C09D 11/34* (2013.01); *C08G 63/12* (2013.01); *C08G 63/80* (2013.01); *C09D 167/00* (2013.01)

(58) Field of Classification Search
CPC ........ C09D 11/34; C09D 167/00; C08K 5/20; C08G 63/80; C08G 63/12; C08L 67/00

USPC .............. 528/271, 302, 272; 524/539, 500, 1, 524/543, 601, 599, 604

See application file for complete search history.

(56) References Cited

U.S. PATENT DOCUMENTS

| | | |
|---|---|---|
| 2,977,385 A | 3/1961 | Fowler et al. |
| 3,053,782 A | 9/1962 | Shelby |
| 4,066,585 A | 1/1978 | Schepp et al. |
| 4,066,858 A | 1/1978 | Piper et al. |
| 4,148,765 A | 4/1979 | Nelson |
| 4,179,420 A | 12/1979 | Laganis |
| 4,332,701 A | 6/1982 | Ponyik, Jr. et al. |
| 5,096,959 A | 3/1992 | Jones et al. |
| 5,385,957 A | 1/1995 | Tobias et al. |
| 6,280,510 B1 | 8/2001 | Kelderman et al. |
| 6,682,587 B2 | 1/2004 | Hendricks et al. |
| 2003/0161961 A1 | 8/2003 | Barsotti et al. |
| 2010/0240817 A1* | 9/2010 | Joshi ..................... C08K 5/103 524/502 |

FOREIGN PATENT DOCUMENTS

| | | |
|---|---|---|
| EP | 1542084 A1 | 6/2005 |
| GB | 1018305 | 1/1966 |
| JP | 53-108198 A | 9/1978 |
| JP | 61-16920 A | 1/1986 |
| JP | 61-163977 A | 7/1986 |
| JP | 10-219168 A | 8/1998 |
| JP | 2004-126544 A | 4/2004 |

* cited by examiner

*Primary Examiner* — Ling Choi
*Assistant Examiner* — Jessica E Whiteley
(74) *Attorney, Agent, or Firm* — Birch, Stewart, Kolasch & Birch, LLP

(57) ABSTRACT

A hot melt ink composition includes a copolyester, the copolyester consisting essentially of a condensation product of a first type of monomer, a second type of monomer and a third type of monomer, wherein the first type of monomer comprises at least one monomer A selected from the group of polyhydroxyl alcohols comprising X hydroxyl functional groups, wherein $X \geq 3$, wherein the second type of monomer comprises at least one monomer B selected from the group of monomers being able to form an ester linkage with an alcohol and wherein the third type of monomer comprises at least one monomer C selected from the group of aromatic monocarboxylic acids. A method for preparing such copolyesters and a hot melt ink composition includes a mixture of such copolyesters.

17 Claims, 1 Drawing Sheet

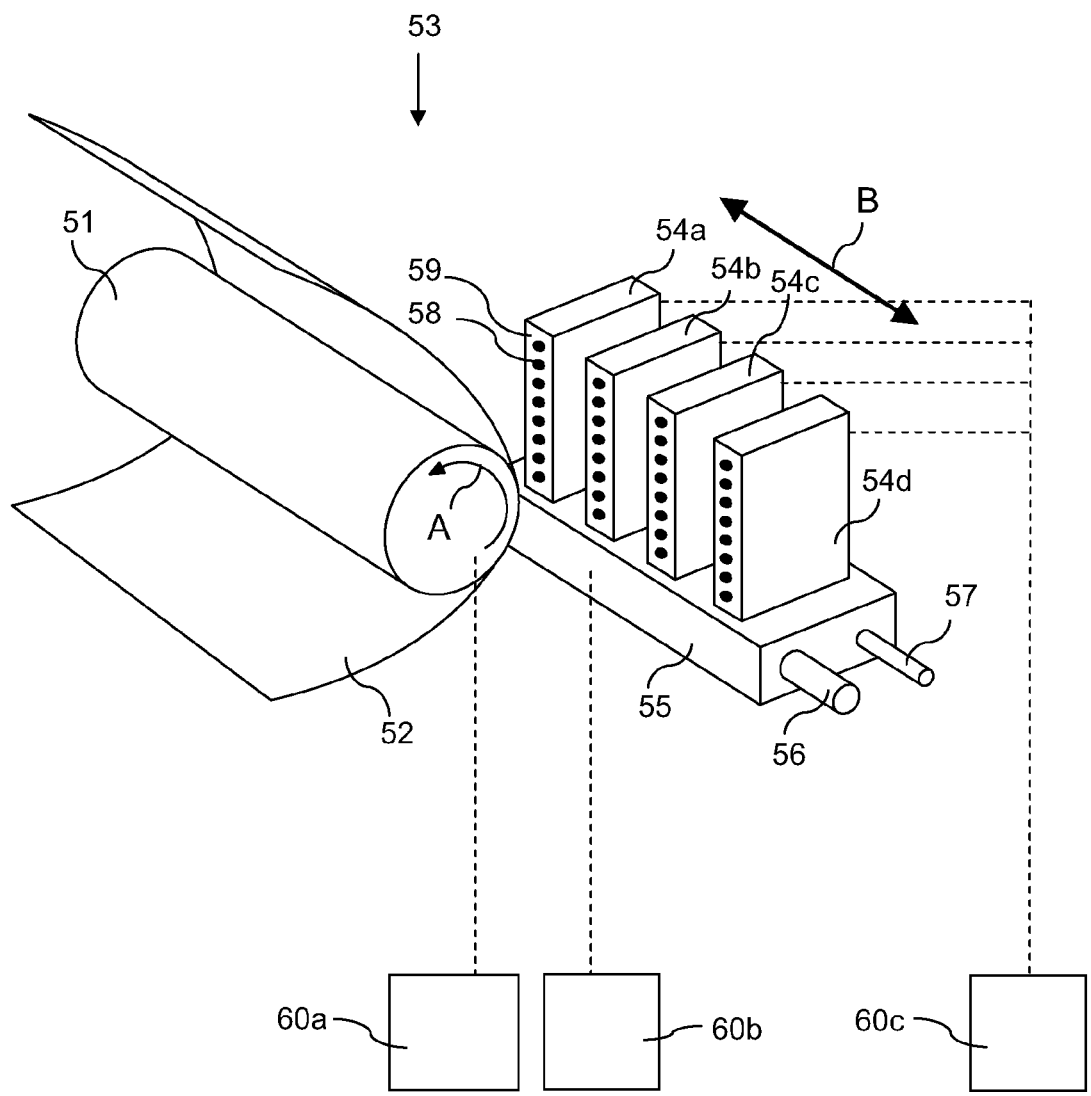

HOT MELT INK COMPOSITION COMPRISING A COPOLYESTER AND PROCESS FOR PREPARING A COPOLYESTER

CROSS-REFERENCE TO RELATED APPLICATIONS

This application is a Continuation of International Application No. PCT/EP2012/061668, filed on Jun. 19, 2012, and for which priority is claimed under 35 U.S.C. §120. PCT/EP2012/061668 claims priority under 35 U.S.C. §119(a) to Application No. 11172140.3, filed in Europe on Jun. 30, 2011. The entire contents of each of the above-identified applications are hereby incorporated by reference into the present application.

BACKGROUND OF THE INVENTION

1. Field of the Invention

The present invention relates to a hot melt ink composition comprising a copolyester. The present invention further relates to a hot melt ink composition comprising a copolyester mixture. The present invention also relates to a process for preparing a copolyester and use of a hot melt ink comprising a copolyester in a ink jet printing process.

2. Description of Background Art

Copolyesters and hot melt ink compositions comprising a copolyester are known in the art. A hot melt ink composition is an ink composition that is solid at room temperature and liquid at elevated temperature. Inks of this kind, are also known as meltable inks or phase change inks. Known hot melt ink compositions comprise for example a crystalline material, a colorant and a binder.

In a printing device, for example an ink jet printer, the ink is melted and transferred to substantially closed ink ducts which lead at one end into an orifice. As a result of a sudden pressure rise in the duct, produced for example by rapidly reducing the volume of the ink duct or rapidly evaporating some of the ink in the duct, a drop of ink may be ejected from the duct through the orifice. In this way, an image may be built up from individual ink drops on a receiving medium. Hot melt inks contain a carrier material with a melting point higher than room temperature. The ink may melt in the printing device. Hot melt inks of this kind have the advantage that they set rapidly on the receiving medium, so that the print quality is less dependent on the type of receiving medium.

However, a disadvantage of the hot melt ink compositions known in the background art is the fact that images formed using these hot melt ink compositions often show low print robustness after printing on a recording medium.

U.S. Pat. No. 6,682,587 B2 discloses polyesters and copolyesters, as well as their use in hot melt inks. The esters and copolyesters described are esters from a dihydroxyl alcohol and an aromatic carboxylic acid.

U.S. Pat. No. 6,280,510 B1 discloses an ink composition for a meltable ink comprising a diester from a 2,2-biphenol compound (a dihydroxyl alcohol) and an aromatic acid. U.S. Pat. No. 6,280,510 B1 further discloses that use of this ink composition provides images showing improved print robustness. However, regarding print robustness, there is room for improvement.

SUMMARY OF THE INVENTION

It is therefore an object of the present invention to provide a hot melt ink composition providing printed images with an improved print robustness.

It is another object of the present invention to provide a process for preparing a copolyester.

These objects are at least partially achieved in a hot melt ink composition, comprising a copolyester, the copolyester consisting essentially of a condensation product of a first type of monomer, a second type of monomer and a third type of monomer, wherein the first type of monomer comprises at least one monomer A being a polyhydroxyl alcohol comprising X hydroxyl functional groups, wherein X≥3, wherein the second type of monomer comprises at least one monomer B being able to form an ester linkage with an alcohol and wherein the third type of monomer comprises at least one monomer C being an aromatic monocarboxylic acid.

The copolyester of the present invention is obtainable by reacting the first type of monomer, the second type of monomer and the third type of monomer as will be explained below.

First Type of Monomer: Monomer A, Polyhydroxyl Alcohol

The first type of monomer comprises at least one monomer A, monomer A comprising at least three hydroxyl functional groups, that are able to form ester linkages upon chemical reaction with a suitable compound. At least one of the hydroxyl functional groups of the first monomer A may be bonded via an ester linkage to the second monomer B. The nature of the latter compounds will be described in more detail later. A function of the first type of monomer, comprising monomer A in the copolyester may be to function as a backbone. The backbone serves to connect the several components of the copolyester. The copolyester according to the present invention may comprise one backbone or may comprise a plurality of backbones. The number of polyhydroxyl alcohols present, functioning as a backbone of the copolyester, may be controlled by controlling relative amounts of each of the first, second and third monomers used in the process for preparing the copolyester, thereby controlling the stoichoimetry of the reaction. Each one of the at least one monomer A comprises at least three hydroxyl functional groups. This may result in the formation of a branched copolyester, instead of a linear copolyester. In general, branched copolyesters tend to be more amorphous than linear copolyesters. An amorphous material is a material that is non-crystalline or has a low level of crystallinity. It is desirable to apply an amorphous copolyester in a hot melt ink, in order to prevent hazing of the print.

The polyhydroxyl alcohols are selected or derived from, but not limited to: glycerol, pentaerythritol, dipentaerythritol, 2-(hydroxymethyl)-2-methylpropane-1,3-diol, 2-ethyl-2-(hydroxymethyl)propane-1,3-diol, 2-(hydroxymethyl)propane-1,3-diol, trimethylolethane, trimethylolpropane, trimethylolbutane and trimethylolpentane. Only one monomer A may be used as a starting material for the copolyester, or alternatively, a plurality of monomers A may be used as the first type of monomer.

Second Type of Monomer: Monomer B

The second type of monomer may comprise at least one monomer B. As the monomer B, a monomer may be used that is able to form an ester linkage with an alcohol. The monomer B may be for example a dicarboxylic acid, an anhydride of a dicarboxylic acid, a lactone or a hydroxycarboxylic acid.

A function of the second type of monomer may be to serve as a spacer in the copolyester. The spacer may be provided to interconnect the different parts of the copolyester on the one hand and to space the different parts of the copolyester on the other hand. Moreover, by applying a spacer in the copolyester, the molecular weight of the copolyester may be suitably controlled. Furthermore, by suitably selecting the spacer used in the copolyester, the properties of the copolyester may be tuned. For example, the glass transition temperature (Tg) and the viscosity of the copolyester may be controlled by suitably selecting the second monomer B. In addition, the distance between the two different functional groups, used to form linkages between the different types of monomers in the copolyester, may be controlled by controlling the nature of the spacer. The spacer may be selected, for example based on its polarity, its rigidity, its molecular weight, etc.

The monomer B may form at least one ester linkage with the first monomer A. For example, in case the monomer B comprises a carboxylic acid functional group, a condensation reaction may take place between the carboxylic acid functional group and one of the hydroxyl functional groups present in the first monomer A, thereby forming an ester linkage between the first and the second monomer. The second monomer may comprise a second functional group, being able to form a second linkage, such as an ester linkage between the spacer and one of the groups selected from the groups present in the monomer A, the monomer B and the monomer C. Alternatively, the second functional group may be present in the monomer B after coupling of the monomer B to the monomer A. For example, in case the monomer B is an anhydride of a dicarboxylic acid or a lactone, the functional group is part of a ring structure. The ring structure needs to be opened, for example during a coupling of the monomer B comprising the ring to the monomer A, before the second functional group is able to form a second linkage to any of the other monomers present.

The spacer may connect two first monomers, thereby interconnecting two backbone moieties of the copolyester. Depending on the desired molecular weight of the copolyester, a plurality of spacers may be used to interconnect the backbone moieties of the copolyester. The backbone moieties are formed by the monomer A, which is a polyhydroxyl alcohol. For interconnecting two polyhydroxyl alcohols, spacers are required that are able to form at least two linkages with the polyhydroxyl alcohol. Dicarboxylic acids, or anhydrides of dicarboxylic acids are able to form two ester linkages with compounds comprising a hydroxyl functional group; i.e. a dicarboxylic acid and two hydroxyl functional group containing compounds may be bonded to one another, thereby forming two ester linkages.

However, the spacer may also be used to interconnect the backbone to an endgroup, formed by the monomer C. The backbone may comprise a plurality of hydroxyl functional groups. The endgroups may comprise a carboxylic acid functional group. Thus, the dicarboxylic acids or the anhydrides of the dicarboxylic acids mentioned above may not be suited to couple the hydroxyl functional group of the backbone to the carboxylic acid functional group of the endgroup. Instead, a spacer is needed that is able to form a linkage with the hydroxyl functional group of the backbone on the one hand and with the carboxylic acid functional group of the endgroup on the other hand. Hydroxyl-carboxylic acids and lactones are therefore suitable spacers. A hydroxyl-carboxylic acid is a compound that comprises both a hydroxyl functional group and a carboxylic acid functional group. The carboxylic acid functional group may form an ester linkage with one of the hydroxyl functional groups of the backbone; the hydroxyl functional group of the hydroxyl-carboxylic acid compound may form an ester linkage with the carboxylic acid functional group of the endgroup. Optionally, more than one spacer may space the backbone and the endgroup. The hydroxyl-carboxylic acid components as mentioned above, may comprise both a hydroxyl functional group and a carboxylic acid functional group. The hydroxyl functional group of a spacer may form an ester linkage with a carboxylic acid functional group of another spacer, and as a consequence, the backbone and the endgroup may be spaced by a chain of spacers.

Preferably the monomer B is selected from, but not limited to, at least one of: phthalic acid, 2-benzofuran-1,3-dione, isophthalic acid, terephthalic acid, hexahydro-2-benzofuran-1,3-dione, cyclohexane-1,2-dicarboxylic acid, cyclohexane-1,3-dicarboxylic acid, cyclohexane-1,4-dicarboxylic acid, dihydrofuran-2,5-dione, oxepane-2,7-dione, dihydro-2H-pyran-2,6(3H)-dione, malonic acid, 2-methylmalonic acid, 2-ethylmalonic acid, 2,2-dimethylmalonic acid, 2,2-diethylmalonic acid, 2,2-methylethylmalonic acid, succinic acid, 2-methylsuccinic acid, 2-ethylsuccinic acid, 2-phenylsuccininc acid, 2,3-dimethylsuccinic acid, 2,3-diethylsuccinic acid, 2,3-methylethylsuccininc acid, glutaric acid, 2-methylglutaric acid, 3-methylglutaric acid, 2,3-dimethylglutaric acid, 2,4-dimethylglutaric acid, 2,3,4-trimethylglutaric acid, 2,2-dimethylglutaric acid, 3,3-dimethylglutaric acid, 2-ethylglutaric acid, 3-ethylglutaric acid, 2,3-diethylglutaric acid, 2,4-diethylglutaric acid, 2,3,4-triethylglutaric acid, 2,2-diethylglutaric acid, 3,3-diethylglutaric acid, 2-phenylglutaric acid, 3-phenylglutaric acid, adipic acid, 2-methyl adipic acid, 3-methyl adipic acid, 2,2-dimethyl adipic acid, 2,3-dimethyl adipic acid, 2,4-dimethyl adipic acid, 2,5-dimethyladipic acid, 3,3-dimethyl adipic acid, 3,4-dimethyl adipic acid, 2-ethyl adipic acid, 3-ethyl adipic acid, 2,2-diethyl adipic acid, 2,3-diethyl adipic acid, 2,4-diethyl adipic acid, 2,5-diethyladipic acid, 3,3-diethyladipic acid, 3,4-diethyl adipic acid, 2,2-ethylmethyl adipic acid, 2-ethyl-3-methyl adipic acid, 3-methyl-2-ethyl adipic acid, 2-phenyl adipic acid, 3-phenyl adipic acid, pimelic acid, 2-methyl pimelic acid, 3-methyl pimelic acid, 4-methyl pimelic acid, 2,2-dimethyl pimelic acid, 2,3-dimethyl pimelic acid, 2,4-dimethylpimelic acid, 2,5-dimethyl pimelic acid, 2,6-dimethyl pimelic acid, 3,3-dimethylpimelic acid, 3,4-dimethylpimelic acid, 3,5-dimethylpimelic acid, 4,4-dimethyl pimelic acid, 2-ethyl pimelic acid, 3-ethyl pimelic acid, 4-ethyl pimelic acid, 2,2-diethyl pimelic acid, 2,3-diethyl pimelic acid, 2,4-diethylpimelic acid, 2,5-diethyl pimelic acid, 2,6-diethyl pimelic acid, 3,3-diethylpimelic acid, 3,4-diethylpimelic acid, 3,5-diethylpimelic acid, 4,4-diethyl pimelic acid, 2,2-ethylmethylpimelic acid, 2-methyl-3-ethyl pimelic acid, 3-methyl-2-ethyl pimelic acid, 2-methyl-4-ethyl pimelic acid, 4-methyl-2-ethyl pimelic acid, 2-phenyl pimelic acid, 3-phenyl pimelic acid, 4-phenyl pimelic acid, suberic acid, 2-methyl suberic acid, 3-methyl suberic acid, 4-methyl suberic acid, 2-ethyl suberic acid, 2,2-dimethyl suberic acid, 2,3-dimethyl suberic acid, 2,4-dimethylsuberic acid, 2,5-dimethyl suberic acid, 2,6-dimethyl suberic acid, 2,7-dimethylsuberic acid, 3,4-dimethyl suberic acid, 3,5-dimethyl suberic acid, 3,6-dimethyl suberic acid, 4,5-dimethyl suberic acid, 3-ethyl suberic acid, 4-ethyl suberic acid, 2-phenyl suberic acid, 3-phenyl suberic acid, 4-phenyl suberic acid, 2,2-diethyl suberic acid, 2,3-diethyl suberic acid, 2,4-diethyl suberic acid, 2,5-diethyl suberic acid, 2,6-diethyl suberic acid, 2,7-diethylsuberic acid, 3,4-diethyl suberic acid, 3,5-diethyl suberic acid, 3,6-diethyl suberic acid, 4,5-diethyl suberic acid, 2-phenyl suberic acid, 3-phenyl suberic acid, 4-phenyl suberic acid, 2,2-methylethyl suberic acid, 2,2-methylphenyl suberic acid, 2,2-ethylphenyl suberic acid, 2-methyl-3 ethyl suberic acid, 2-methyl-3-ethyl suberic acid, 2-methyl-3-phenyl suberic acid, 3-methyl-2-phenyl suberic acid, 3-ethyl-2-phenyl suberic acid, 2-ethyl-3-phenyl suberic acid, azelaic acid, 2-methyl azelaic acid, 3-methyl azelaic acid, 4-methyl azelaic acid, 5-methyl azelaic acid, 2,2-dimethyl azelaic acid, 2,3-dimethyl azelaic acid, 2,4-dimethyl azelaic acid, 2,5-dimethyl azelaic acid, 2,6-dimethyl azelaic acid, 2,7-dimethyl azelaic acid, 2,8-dimethyl azelaic acid, 3,3-dimethyl azelaic acid, 3,4-dimethyl azelaic acid, 3,5-dimethyl azelaic acid, 3,6-dimethyl azelaic acid, 3,7-dimethyl azelaic acid, 4,4-dimethyl azelaic acid, 4,5-dimethyl azelaic acid, 4,6-dimethyl azelaic acid, 5,5-dimethyl azelaic acid, 2-ethyl azelaic acid, 3-ethyl azelaic acid, 4-ethyl azelaic acid, 5-ethyl azelaic acid, 2,2-diethyl azelaic acid, 2,3-diethyl azelaic acid, 2,4-diethyl azelaic acid, 2,5-diethyl azelaic acid, 2,6-diethyl azelaic acid, 2,7-diethyl azelaic acid, 2,8-diethyl azelaic acid, 3,3-diethyl azelaic acid, 3,4-diethyl azelaic acid, 3,5-diethyl azelaic acid, 3,6-diethyl azelaic acid, 3,7-diethyl azelaic acid, 4,4-diethyl azelaic acid, 4,5-diethyl azelaic acid, 4,6-diethyl azelaic acid, 5,5-diethyl azelaic acid, 2-phenyl azelaic acid, 3-phenyl azelaic acid, 4-phenyl azelaic acid, 5-phenyl azelaic acid, sebacic acid, 2-methyl sebacic acid, 3-methyl sebacic acid, 4-methyl sebacic acid, 5-methyl sebacic acid, 6-methyl sebacic acid, 2,2-dimethyl sebacic acid, 2,3-dimethyl sebacic acid, 2,4-dimethyl sebacic acid, 2,5-dimethyl sebacic acid, 2,6-dimethyl sebacic acid, 2,7-dimethyl sebacic acid, 2,8-dimethyl sebacic acid, 2,9-dimethyl sebacic acid, 2,10-dimethyl sebacic acid, 2,11-dimethyl sebacic acid, 3,3-dimethyl sebacic acid, 3,4-dimethyl sebacic acid, 3,5-dimethyl sebacic acid, 3,6-dimethyl sebacic acid, 3,7-dimethyl sebacic acid, 3,8-dimethyl sebacic acid, 3,9-dimethyl sebacic acid, 3,10-dimethyl sebacic acid, 4,4-dimethyl sebacic acid, 4,5-dimethyl sebacic acid, 4,6-dimethyl sebacic acid, 4,7-dimethyl sebacic acid, 4,8-dimethyl sebacic acid, 4,9-dimethyl sebacic acid, 5,5-dimethyl sebacic acid, 5,6-dimethyl sebacic acid, 5,7-dimethyl sebacic acid, 5,8-dimethyl sebacic acid, 6,6-dimethyl sebacic acid, 6,7-dimethyl sebacic acid, 2-ethyl sebacic acid, 3-ethyl sebacic acid, 4-ethyl sebacic acid, 5-ethyl sebacic acid, 6-ethyl sebacic acid, 2,2-diethyl sebacic acid, 2,3-diethyl sebacic acid, 2,4-diethyl sebacic acid, 2,5-diethyl sebacic acid, 2,6-diethyl sebacic acid, 2,7-diethyl sebacic acid, 2,8-diethyl sebacic acid, 2,9-diethyl sebacic acid, 2,10-diethyl sebacic acid, 2,11-diethyl sebacic acid, 3,3-diethyl sebacic acid, 3,4-diethyl sebacic acid, 3,5-diethyl sebacic acid, 3,6-diethyl sebacic acid, 3,7-diethyl sebacic acid, 3,8-diethyl sebacic acid, 3,9-diethyl sebacic acid, 3,10-diethyl sebacic acid, 4,4-diethyl sebacic acid, 4,5-diethyl sebacic acid, 4,6-diethyl sebacic acid, 4,7-diethyl sebacic acid, 4,8-diethyl sebacic acid, 4,9-diethyl sebacic acid, 5,5-diethyl sebacic acid, 5,6-diethyl sebacic acid, 5,7-diethyl sebacic acid, 5,8-diethyl sebacic acid, 6,6-diethyl sebacic acid, 6,7-diethyl sebacic acid, 2-phenyl sebacic acid, 3-phenyl sebacic acid, 4-phenyl sebacic acid, 5-phenyl sebacic acid, 6-phenyl sebacic acid, 2,2-diphenyl sebacic acid, 2,3-diphenyl sebacic acid, 2,4-diphenyl sebacic acid, 2,5-diphenyl sebacic acid, 2,6-diphenyl sebacic acid, 2,7-diphenyl sebacic acid, 2,8-diphenyl sebacic acid, 2,9-diphenyl sebacic acid, 2,10-diphenyl sebacic acid, 2,11-diphenyl sebacic acid, 3,3-diphenyl sebacic acid, 3,4-diphenyl sebacic acid, 3,5-diphenyl sebacic acid, 3,6-diphenyl sebacic acid, 3,7-diphenyl sebacic acid, 3,8-diphenyl sebacic acid, 3,9-diphenyl sebacic acid, 3,10-diphenyl sebacic acid, 4,4-diphenyl sebacic acid, 4,5-diphenyl sebacic acid, 4,6-diphenyl sebacic acid, 4,7-diphenyl sebacic acid, 4,8-diphenyl sebacic acid, 4,9-diphenyl sebacic acid, 5,5-diphenyl sebacic acid, 5,6-diphenyl sebacic acid, 5,7-diphenyl sebacic acid, 5,8-diphenyl sebacic acid, 6,6-diphenyl sebacic acid, 6,7-diphenyl sebacic acid, 3-methyl-10-ethyl sebacic acid, 3-ethyl-10-methyl sebacic acid, 3-methyl-10-phenyl sebacic acid, 3-phenyl-10-ethyl sebacic acid, 3-ethyl-10-phenyl sebacic acid, 3-phenyl-10-ethyl sebacic acid, 1,9-nonanedicarboxylic acid, and derivatives thereof, such as alkyl-derivatives or aryl-derivatives, 1,10-decanedicarboxylic acid and derivatives thereof, such as alkyl-derivatives or aryl-derivatives, anhydrides of the above mentioned carboxylic acids, such as, but not limited to succinic anhydride, maleic anhydride, phthalic anhydride, acetic anhydride, cantharidin, malonic anhydride, glutaric anhydride and adipic anhydride. Alternatively, the monomer B may be selected form at least one hydroxyl carboxylic acid, such as lactic acid, 3-hydroxypropanoic acid, 2-hydroxybutanoic acid, 3-hydroxybutanoic acid, 4-hydroxybutanoic acid, 2-hydroxypentanoic acid, 3-hydroxypentanoic acid, 4-hydroxy valeric acid, 5-hydroxy valeric acid, 2-hydroxyisocaproic acid, 2-hydroxy hexanoic acid, 3-hydroxy hexanoic acid, 4-hydroxy hexanoic acid, 5-hydroxy hexanoic acid, 6-hydroxy hexanoic acid, 2-hydroxy heptanoic acid, 3-hydroxy heptanoic acid, 4-hydroxy heptanoic acid, 5-hydroxy heptanoic acid, 6-hydroxy heptanoic acid, 7-hydroxy heptanoic acid, 2-hydroxy octanoic acid, 3-hydroxy octanoic acid, 4-hydroxy octanoic acid, 5-hydroxy octanoic acid, 6-hydroxy octanoic acid, 7-hydroxy octanoic acid, 8-hydroxy octanoic acid, and derivatives thereof, for example alkyl derivatives thereof or aryl derivatives thereof, or lactones, such as α-acetolactone, β-propiolactone, γ-butyrolactone, and δ-valerolactone, ε-caprolactone, and derivatives thereof, for example alkyl derivatives thereof or aryl derivatives thereof.

Third Type of Monomer: Monomer C; Aromatic Monocarboxylic Acid

The aromatic monocarboxylic acids may comprise a carboxylic acid functional group and may be able to form an ester linkage. The ester linkage may be formed either between the aromatic monocarboxylic acid and the monomer A, or between the aromatic monocarboxylic acid and the monomer B. By forming an ester linkage using a monocarboxylic acid, the polyester is terminated; no other ester linkage may be formed, thereby controlling the molecular weight $M_w$ of the copolyester. Without wanting to be bound to any theory, the fact that the monocarboxylic acid is an aromatic monocarboxylic acid and therefore comprises a rigid aromatic moiety, is believed to provide the resulting copolyester with rigidity. The nature of the third monomer may be used to tune the interactions between the copolyester and the other components present in the hot melt ink composition. Optionally, a mixture of monomers of the third type of monomer may be used. By using a mixture of monomers, the properties of the copolyester and the interactions between the copolyester and the other components present in the hot melt ink composition may be further tuned.

The aromatic monocarboxylic acids are selected or derived from, but not limited to: benzoic acid, 2-methylbenzoic acid, 3-methylbenzoic acid, 4-methylbenzoic acid, 2,3-dimethylbenzoic acid, 2,6-dimethylbenzoic acid, 3-5-dimethylbenzoic acid, 2-4-6-trimethylbenzoic acid, 2-$^{tert}$butylbenzoic acid, 3-$^{tert}$butylbenzoic acid, 4-$^{tert}$butylbenzoic acid, 3,5-di$^{tert}$butylbenzoic acid, 2,3-di$^{tert}$butylbenzoic acid, 2-methoxybenzoic acid, 3-methoxybenzoic acid, 4-methoxybenzoic acid, 2,3-dimethoxybenzoic acid, 2,4-dimethoxybenzoic acid, 2,5-dimethoxybenzoic acid, 3,5-dimethoxybenzoic acid, 2-ethoxybenzoic acid, 3-ethoxybenzoic acid, 4-ethoxybenzoic acid, 2,3-diethoxybenzoic acid, 2,4-diethoxybenzoic acid, 2,5-diethoxybenzoic acid, 3,5-diethoxybenzoic acid, phenoxyacetic acid, (2-methylphenoxy)acetic acid, (3-methylphenoxy)acetic acid, (4-methylphenoxy)acetic acid, 2-phenoxypropanoic acid, 2-phenoxybutyric acid, naphthalene-1-carboxylic acid, naphthalene-2-carboxylic acid and 2-(naphthalen-1-yl) acetic acid.

Preferably the monomer C is selected from one or more of the group consisting of benzoic acid, 2-methylbenzoic acid, 3-methylbenzoic acid, 4-methylbenzoic, 2-methoxybenzoic acid, 3-methoxybenzoic acid and 4-methoxybenzoic acid.

The copolyester in accordance with the present invention may have a branched structure, because of the use of a polyhydroxyl compound as a backbone building block. Without wanting to be bound to any theory, it is believed that the branched structure of the copolyester may provide the copolyester with different properties, such as, but not limited to viscosity or Tg, compared to similar linear copolyesters. For example, a branched copolyester may have a different viscosity and a different Tg than a linear copolyester of the same molecular weight and the same polarity. First of all, because of the branched structure, more end groups may be present in the branched copolyester than in a linear copolyester. The end groups in the copolyester in accordance with the present invention may be aromatic monocarboxylic acids. Without wanting to be bound to any theory, the aromatic end groups are believed to interact with one another, for example via π-π stacking. These interactions between the aromatic moieties are believed to increase the rigidity of the polymer. Thus, without wanting to be bound to any theory, it is believed that the branched copolyesters are more rigid than linear copolyesters of the same molecular weight.

The viscosity of a hot melt ink composition may not be too high at jetting conditions, otherwise the ink composition may not be jetted. Therefore, also the viscosity of the components of the hot melt ink compositions may preferably be low, preferably below 1000 mPas. On the other hand, it is preferred that the Tg of the copolyester is relatively high. Copolyesters in accordance with the present invention may combine a relatively high Tg, for example a Tg in the range of from −10° C. to 50° C. with a low viscosity, for example a viscosity in the range of 10 mPa s-1000 m Pa s, preferably from 11 mPa s-400 mPa s. On the other hand, linear copolyesters may have a lower Tg at the same viscosity, compared to the copolyester in accordance with the present invention. Without wanting to be bound to any theory, it is believed that the low viscosity and the relatively high viscosity provide the copolyester with advantageous properties for use in a hot melt ink composition. The low viscosity may enable efficient jetting of the hot melt ink composition comprising the copolyester and the relatively high Tg may provide the ink composition with rigidity.

In an embodiment, the copolyester is a copolyester from at least one monomer A, said at least one monomer A being a polyhydroxyl alcohol comprising X hydroxyl functional groups, wherein X≥4, at least one monomer B, said second monomer B being able to form an ester linkage with an alcohol, and at least two monomers C($C^1$ and $C^2$), being aromatic monocarboxylic acids, wherein the at least two different monomers C comprise at least two different aromatic monocarboxylic acids. In case the monomer A comprises a relatively large amount of hydroxyl groups (X≥4), then a relatively large number of aromatic monocarboxylic acid monomers may be present. In order to tune the nature of the resin and to keep the resin amorphous, it is necessary that the interaction between the several end groups, originating from the aromatic monocarboxylic acid monomers, is not too strong. To control the interaction between the end groups in the copolyester, more than one different end group needs to be incorporated into the copolyester. Without wanting to be bound to any theory, it is believed that different end groups will show less interaction with respect to one another, than a plurality of end groups originating from aromatic monocarboxylic acid monomers of the same type. As a consequence, more than one type of aromatic monocarboxylic acid may be provided in the copolyester to control the interaction between the end groups in the copolyester and thereby lower the interaction between the endgroups in the copolyester, such that the tendency of the copolyester to crystallize may decrease, thereby providing a more amorphous copolyester.

In an embodiment, the hot melt ink composition further comprises a copolyester, the copolyester consisting essentially of a condensation product of the first type of monomer and the third type of monomer, wherein the first type of monomer comprises at least one monomer A', the monomer A' being a polyhydroxyl alcohol comprising X hydroxyl functional groups, wherein X≥3, and wherein the third type of monomer comprises at least one monomer C' being an aromatic carboxylic acid, and wherein, if X≥4, the third type of monomer comprises at least two monomers $C^{1\prime}$ and $C^{2\prime}$, the monomers $C^{1\prime}$ and $C^{2\prime}$ being aromatic carboxylic acids, wherein $C^{1\prime}$ is different from $C^{2\prime}$. The monomer A', which is a monomer from the first type of monomer may be similar to the monomer A. Alternatively, the monomer A' may be different from monomer A. The monomers C and C' may be the same component or may be different components. The latter copolyester lacks a second monomer B, that may function as a spacer. Generally, copolyesters consisting essentially of a condensation product of a polyhydroxyl alcohol comprising X hydroxyl functional groups, wherein X≥3, and a monocarboxylic aromatic acid have a lower weight averaged molecular weight ($M_w$) than a copolyester consisting essentially of a condensation product of a polyhydroxyl alcohol comprising X hydroxyl functional groups, wherein X≥3, a monocarboxylic aromatic acid and a second type of monomer, the second type of monomer comprising monomer B, said monomer B being able to form an ester linkage with an alcohol. Without wanting to be bound to any theory, the molecular weight, such as the weight averaged molecular weight is related to the viscosity of a component; the lower the molecular weight, the lower the viscosity for a certain type of component. Therefore, the addition of the addition copolyester, not comprising the second monomer B, may lower the viscosity of the ink composition, which may beneficial for the jetting of the hot melt ink composition.

If A is similar to A', and C is similar to C', then the copolyester from A' and C' may be formed as a side product during the synthesis of the copolyester from A, B and C. Alternatively, the copolyester that consists essentially of a condensation product of the first type of monomer and the third type of monomer may be synthesized separately and may be added to an ink composition, comprising the copolyester in accordance with the present invention. In the latter case, different polyhydroxyl alcohol components and/or different aromatic monocarboxylic acids may be used for the copolyester comprising the second monomer B and the copolyester not comprising the second monomer B.

In an embodiment, the viscosity η of the copolyester at a temperature of 150° C. is in the range of 10 mPa s to 1000 mPa s. Preferably, the viscosity of the copolyester is in the range of 12 mPa s to 400 mPa s. More preferably, the viscosity of the copolyester is in the range of 15 mPa s to 300 m Pa s. The copolyester in accordance with the present invention is one of the components of the hot melt ink composition according to the present invention. A hot melt ink composition is an ink composition that is solid at room temperature and liquid at elevated temperature. Hot melt ink is generally applied to a recording medium to form an image on the recording medium by jetting of droplets of the hot melt ink. In order to be jetted, the ink has to be in a fluid state and consequently, the hot melt ink is jetted at elevated temperature. For example, the hot melt ink composition may be jetted at a temperature from about 90° C. to about 170° C. Preferably, the ink jet composition may be jetted at a temperature of about 100° C. to about 150° C. It is preferred that an ink composition that is to be jetted has a relatively low viscosity to facilitate the jetting process. Thus, a hot melt ink composition preferably has a low viscosity at the elevated temperature, at which the hot melt ink is jetted. Therefore, it is preferred that the ink composition has a relatively low viscosity at 150° C., for example lower than 150 mPa s, preferably lower than 90 mPa s, such as from 5 mPa s to 50 mPa s, for example from 8 mPa s to 25 mPa s.

In an embodiment, the weight averaged molecular weight ($M_w$) of the copolyester is less than 4000 gram/mole. Preferably, the $M_w$ of the copolyester is in the range of 500-3800 gram/mole. More preferably, the $M_W$ of the copolyester is in the range of 1000-3600 gram/mole. Even more preferably, the $M_w$ of the copolyester is in the range of 1500-3200 gram/mole. Generally, the molecular weight, or the weight averaged molecular weight of a compound influence the viscosity of the compound; the higher the molecular weight (or $M_w$), the higher the viscosity η of the compound. As explained above, it is desired that the viscosity of the copolyester is relatively low. Therefore, it is preferred that the weight averaged molecular weight of the compound is relatively low, such as 4000 gram/mole or less. In addition, the molecular weight may also influence the Tg of the copolyester.

The copolyester of the present invention is obtainable by reacting the first, second and third types of monomer as will be explained later.

In an embodiment, the polydispersity of the copolyester, defined as the ratio between the weight averaged molecular weight $M_w$ of the copolyester and the number averaged molecular weight $M_n$ of the copolyester ($M_w/M_n$), is within the range of from 1.0 to 3.5, preferably from 1.1 to 3.0, for example from 1.2 to 2.5.

As stated above, the polydispersity of the copolyester in accordance with the present invention may be more than 1. This may originate from the fact that in a polycondensation reaction, more than one different copolyester compound may be formed. As a consequence, a mixture of copolyesters from the first, the second and the third type of monomer may be formed.

The copolyester in accordance with the present invention may function as a binder in the hot melt ink composition.

The copolyester in accordance with the present invention may preferably be stable at high temperatures, such as temperatures in the range of 100° C. to 200° C.; i.e., the copolyester in accordance with the present invention may not degrade when it is kept at higher temperatures for a certain period of time.

The hot melt ink composition may further comprise a high melting crystalline component. The high-melting crystalline component has a relatively high melting point; for example in the range of from 90° C. to 150° C. Preferably, the melting point of the high-melting crystalline component is in the range of 95° C. and 130° C. More preferably, the melting point of the high melting crystalline is in the range of 100° C. and 120° C.

The high melting crystalline component is liquid at jetting conditions and typically has crystalline properties at a temperature below 100° C., preferably below 90° C. The high melting crystalline component is present in an amount of from 30 percent by weight (30 wt %) to 80 percent by weight (80 wt %), preferably in an amount of from 40 wt % to 70 wt %, such as from 42 wt % to 55 wt %, or from 50 wt % to 67 wt %. The presence of the high melting crystalline material provides rigidity to the hot melt ink composition at elevated temperatures and thereby provides a fusible hot melt ink composition. The high melting crystalline material may cool down after being jetted onto a receiving medium. Because the melting point of the material is high, the crystalline material may solidify and/or crystallize fast after printing. Because the high melting crystalline material crystallizes relatively fast, the printed image may be fused after printing, which may improve the robustness of the print even further.

Non-limiting examples of the high melting crystalline material are shown in table 1.

TABLE 1

Examples of high melting crystalline components

| Compound no. | Molecular structure |
|---|---|
| 1 | (structure shown) n = 4, 5, 6, 7, 8 or 9 |
| 2 | (structure shown) n = 6, 7, 8, 9, 10, 11, 12, 13, 14, 15 or 16 |
| 3 | (structure shown) n = 2, 3 or 4 |

TABLE 1-continued

Examples of high melting crystalline components

| Compound no. | Molecular structure |
|---|---|
| 4 | (structure: 4-methylphenyl ester–CO–(CH$_2$)$_4$–CO–ester 4-methylphenyl) |
| 5 | (structure: PhO–CH$_2$CH$_2$–(CH$_2$)$_n$–CH$_2$CH$_2$–OPh), n = 1, 2, 3, 4, 5 or 6 |
| 6 | (structure: 4-MeO-C$_6$H$_4$–O–CH$_2$CH$_2$–(CH$_2$)$_n$–CH$_2$CH$_2$–O–C$_6$H$_4$-4-OMe), n = 3, 4, 5 or 6 |
| 7 | (structure: 4-EtO-C$_6$H$_4$–O–CH$_2$CH$_2$–(CH$_2$)$_n$–CH$_2$CH$_2$–O–C$_6$H$_4$-4-OEt), n = 3, 4, 5 or 6 |
| 8 | (structure: phthalimide–N–(CH$_2$)$_n$–N–phthalimide), n = 4, 5, 6, 7, 8, 9 or 10 |
| 9 | (structure: 4-methylbenzoate–O–(CH$_2$)$_n$–O–benzoate 4-methyl), n = 2, 4, 6, 8, 10 |

The hot melt ink composition may further comprise a low melting crystalline component. The low melting crystalline material has a relatively low melting point; for example in the range of from 45° C. to 90° C., preferably from 55° C. to 85° C., for example from 60° C. to 70° C. The low melting crystalline component may be present in the hot melt ink composition in an amount of 2 wt % to 30 wt %, such as from 5 wt % to 20 wt %, such as 6 wt % to 10 wt % or 12 wt % to 18 wt %.

The presence of the low melting crystalline material provides rigidity to the hot melt ink composition on the recording medium at lower temperatures, such as room temperature. Additionally, the presence of the low melting crystalline material provides flexibility to the ink composition at elevated temperatures and thereby provides a fusible hot melt ink composition.

Non-limiting examples of the low melting crystalline material are shown in table 2.

TABLE 2

Examples of low melting crystalline components

| Compound no. | Molecular structure |
|---|---|
| 10 | (structure: CH$_3$–(CH$_2$)$_{16}$–C(O)–NH–[CH$_2$CH(CH$_3$)–O]$_4$–NH–C(O)–(CH$_2$)$_{16}$–CH$_3$) |

TABLE 2-continued

Examples of low melting crystalline components

| Compound no. | Molecular structure |
|---|---|
| 11 | (structure with NH groups, O linkages, repeating unit subscript 4) |
| 12 | (structure with NH groups, O linkages, repeating units x, y, z) $9 \leq x+y+z \leq 11$ |

The hot melt ink composition may further comprise a colorant. The colorant may be a pigment, a mixture of pigments, a dye, a mixture of dyes, a mixture of a dye and a pigment or a mixture of more than one dye and more than one pigment. Pigments are preferred, because of their superior color fastness with respect to dyes.

In an aspect of the present invention, a process for preparing the copolyesters in accordance with the present invention is provided.

In case the second monomer B is a dicarboxylic acid or an anhydride of a dicarboxylic acid, a process is provided for preparing the copolyester, the copolyester consisting essentially of a condensation product of a first type of monomer, a second type of monomer and a third type of monomer, wherein the first type of monomer comprises at least one monomer A, said monomer A being a polyhydroxyl alcohol comprising X hydroxyl functional groups, wherein X≥3, wherein the second type of monomer comprises at least one monomer B consisting of a dicarboxylic acid and an anhydride of a dicarboxylic acid, and wherein the third type of monomer comprises at least one monomer C being an aromatic monocarboxylic acid, the process comprising the steps of:

a) bringing a first molar amount $n_A$ of the first type of monomer, a second molar amount $n_B$ of the second type of monomer and a third molar amount $n_C$ of the third type of monomer under an inert atmosphere in a reactor, provided with a Dean Stark unit, in a ratio Q, wherein Q is defined as:

$$\frac{X^* n_A}{2 n_B + n_C},$$

wherein 0.75<Q<1.25;

b) heating the mixture to 150° C.-250° C., such that the water formed by the condensation reaction is removed from the reaction mixture; and c) after the reaction has completed, removing the solvent by distillation.

A copolyester is a molecule comprising a number of ester linkages. An ester linkage is typically formed by reacting a compound comprising a hydroxyl functional group with a compound comprising a carboxylic acid functional group. The copolyester according to the present invention may be formed by reaction a polyhydroxyl alcohol comprising X hydroxyl functional groups, wherein X≥3, with aromatic monocarboxylic acids and with dicarboxylic acids or anhydrides of dicarboxylic acids. Both dicarboxylic acids and anhydrides of dicarboxylic acids may form two ester linkages upon reaction with compounds comprising a hydroxyl functional group.

Preferably, all hydroxyl functional groups present in the polyhydroxyl alcohol, as well as all carboxylic acid functional groups and all anhydrides of carboxylic acid groups are converted, thereby forming ester functional groups. To achieve this, the number of hydroxyl functional groups present in the reaction mixture has to correspond to the number of carboxylic acid functional groups in the reaction mixture, or alternatively, the number of hydroxyl functional groups present in the reaction mixture has to correspond to the number of carboxylic acid functional groups plus half the number of anhydrides of dicarboxylic acids in the reaction mixture. Therefore, Q (the ratio between the molar amount of hydroxyl functional groups ($X^* n_A$) and the molar amounts of the aromatic monocarboxylic acids and twice the molar amount of the second monomer ($2 n_B + n_C$)), is in between 0.75 and 1.25. Preferably, the ratio Q is in between 0.90 and 1.10. More preferably, the ratio Q is in between 0.95 and 1.05, such as in between 0.97 and 1.01, or in between 0.99 and 1.03.

More than one monomer A may be used as the monomer of the first type of monomers. For example, two different monomers A ($A^1$ and $A^2$) may be used as monomers of the first type of monomer. The number of hydroxyl functional groups may differ for the two monomers $A^1$ and $A^2$. Monomer $A^1$ may be used in a molar amount $n_{A\,1}$ and monomer $A^2$ may be used in a molar amount $n_{A\,2}$. For example, the number of hydroxyl groups for monomer $A^1$ ($X^1$) may be 3, whereas number of hydroxyl groups for monomer $A^2$ ($X^2$) may be 4. $X^* n_A$ may then be calculated as:

$$X^* n_A = X^1 * \frac{n_{A1}}{n_{A1} + n_{A2}} + X^2 * \frac{n_{A2}}{n_{A1} + n_{A2}}.$$

The molar amounts $n_A$, $n_B$ and $n_C$ refer to the total molar amounts of the first type of monomer, the second type of monomer and the third type of monomer, respectively.

In an alternative embodiment, the copolyester in accordance with the present invention is prepared in a step-wise procedure, instead of in a one-step procedure, as described above. For example, the first type of monomer comprising monomer A, being a polyhydroxyl alcohol comprising X hydroxyl functional groups, wherein X≥3 may be reacted with the second type of monomer, the second type of monomer comprising monomer B, being a dicarboxylic acid or an anhydride of a dicarboxylic acid, in a first step, resulting in the formation of a copolyester from the first type of monomer and the second type of monomer. In a subsequent step, the reaction product from the first step, may be further reacted with the third type of monomer, the third type of monomer comprising monomer C, being an aromatic monocarboxylic acid. In this subsequent step, the copolyester in accordance with the present invention may be obtained. Without wanting to be bound to any theory, it is believed that the molecular weight and/or the polydispersity of the copolyester may be controlled even more efficiently if the copolyester is prepared in a step-wise procedure.

The polycondensation reaction is preferably carried out in the presence of a solvent. Examples of suitable solvents include, but are not limited to xylene, toluene, benzene, alkenes, such as hexane, pentane, octane, nonane, decane. Alternatively, the polycondensation reaction of the monomers wherein the monomers react to form ester linkages and discharge water may be carried out in the melt.

In a polycondensation reaction, a chemical bond is formed together with the loss of a small molecule, i.e. a molecule having a low molecular weight, for example water. The polycondensation reaction between an alcohol and a carboxylic acid or the anhydride of a carboxylic acid, forming an ester and water is an equilibrium reaction. To force the reaction to go to completion (completely react the alcohols and carboxylic acids or anhydrides of carboxylic acids to from esters and water) or at least to a high conversion, usually water is removed from the reaction mixture. A solvent may be selected that forms an azeotropic mixture with water, such that the removal of water from the reaction mixture is facilitated. Examples of such solvents are xylene or toluene. These solvents may be used alone, or in combination with another solvent. An advantage of xylene over toluene is its higher boiling point, thereby allowing the reaction to take place at higher temperatures, thereby increasing the rate of reaction. Alternatively, or in addition to the use of a solvent forming an azeotropic mixture with water, the water may be removed under reduced pressure.

A second measure to remove water formed during the polycondensation reaction, is equipping the reactor with a Dean-Stark trap. A Dean-Stark trap or apparatus (or Dean-Stark receiver or distilling trap) is a piece of equipment used in synthetic chemistry to collect water (or occasionally other liquid) from a reactor. It may be used in combination with a reflux condenser and a batch reactor for continuous removal of the water (from a two-phase reacting system) that is produced during a chemical reaction performed at reflux temperature.

To improve the reaction rate, a polycondensation catalyst may be added. Suitable polycondensation catalyst are known in the art and include, for example all salts of Li, Ca, Mg, Mn, Zn, Pb, Sn, Sb, Ge and Ti, such as acetate salts and oxides, including glycol adducts and Ti alkoxides, are suitable condensation catalysts.

Particular examples of suitable condensation catalysts are: titanium(IV)(tert)-butoxide; tin(II)oxide; zinc acetate; antimony(III)oxide and tin(II) 2-ethylhexanoate. Alternatively, the polycondensation reaction may be catalyzed by an acid.

The reaction mixture is heated to 150° C.-250° C., such that the water formed by the condensation reaction is removed from the reaction mixture. Preferably, the reaction mixture is heated to 170° C.-230° C., for example the reaction mixture is heated to 180° C.-210° C., or the reaction mixture is heated to 190° C.-240° C. An additional advantage of the temperature raise is that at higher temperatures, the rate of reaction is higher compared to lower temperatures. The maximum temperature at which the reaction may be carried out depends for example on the solvent or solvent mixture that is used to carry out the reaction; the reaction temperature should not exceed the boiling point of the solvent.

In case the second monomer B is a lactone or a hydroxyl carboxylic acid, a process is provided for preparing the copolyester, the copolyester consisting essentially of a condensation product of a first type of monomer, a second type of monomer and a third type of monomer, wherein the first type of monomer comprises at least one monomer A, said monomer being a polyhydroxyl alcohol comprising X hydroxyl functional groups, wherein X≥3, wherein the second type of monomer comprises at least one monomer B consisting of a lactone and a hydroxyl carboxylic acid, and wherein the third type of monomer comprises at least one monomer C being an aromatic monocarboxylic acid, the process comprising the steps of:

a) bringing a first molar amount $n_A$ of the first type of monomer, a second molar amount $n_B$ of the second type of monomer, $n_B>0$ and a third molar amount $n_C$ of the third type of monomer under an inert atmosphere in a reactor, provided with a Dean Stark unit, in a ratio Q', wherein Q' is defined as $$\frac{X*n_A}{n_C}$$

and wherein 0.75<Q'<1.25;

b) heating the mixture to 150° C.-250° C., such that the water formed by the condensation reaction is removed from the reaction mixture; and c) after the reaction has completed, removing the solvent by distillation.

As mentioned above, hydroxyl functional groups present in the reaction mixture may react with a carboxylic acid or a lactone present in the reaction mixture, thereby forming an ester linkage. Preferably, the molar amount of the hydroxyl functional groups corresponds to the number of carboxylic acids in the reaction mixture. The hydroxyl carboxylic acids comprise an equal number of hydroxyl functional group and carboxylic functional groups. Lactones, upon ring opening, also contain an equal number of hydroxyl functional groups and carboxylic functional groups. As a consequence, both lactones and hydroxyl carboxylic acids are able to form ester linkages with one another and the molar amount of lactones or hydroxyl carboxylic acids present does not influence the desired ratio between the polyhydroxyl alcohol and the aromatic acid.

The ratio Q' (the ratio between X times the molar amount of the polyhydroxyl alcohols present in the reaction mixture ($X*n_A$) and the aromatic monocarboxylic acids present in the reaction mixture ($n_C$)) is in between 0.75 and 1.25. Preferably, the ratio Q' is in between 0.85 and 1.15. More preferably, the ratio Q' is in between 0.90 and 1.10, such as in between 0.95 and 1.05, for example in between 0.97 and 1.03. In theory, any amount of the second monomer B may be provided to the reaction mixture, provided that the amount of the second monomer B is more than 0.

In an embodiment, the process for preparing the copolyester further comprises the step of:

d) distilling the copolyester under reduced pressure.

By distilling the copolyester under reduced pressure, components present in the reaction product that are relatively volatile, such as unreacted monomer, may be easily removed from the reaction mixture, thereby purifying the copolyester.

In the context of the present invention, a reduced pressure is to be construed as a pressure of below $10^{-2}$ mbar and an inert atmosphere is to be construed as an atmosphere containing inert components, i.e. components that do not react with or influence the reaction between the three monomers, e.g. a nitrogen atmosphere.

In an aspect of the present invention, the hot melt ink composition may be used in a printing process.

In an aspect of the present invention, a hot melt ink composition is provided, the hot melt ink composition comprising a copolyester from at least a first monomer A, said first monomer A being a polyhydroxyl alcohol comprising X hydroxyl functional groups, wherein X≤3, a second monomer B, said second monomer B being able to form an ester linkage with an alcohol, and a third monomer C, being an aromatic monocarboxylic acid.

In an embodiment, the viscosity η of the copolyester at a temperature of 150° C. is less than 400 mPa s.

In an embodiment, the weight averaged molecular weight $M_w$ of the copolyester is 4000 gram/mole or less.

In an embodiment, the first monomer A is selected from the group consisting of glycerol, pentaerythritol, 2-(hydroxymethyl)-2-methylpropane-1,3-diol, 2-ethyl-2-(hydroxymethyl)propane-1,3-diol, dipentaerythritol, trimethylolethane, trimethylolpropane, trimethylolbutane and trimethylolpentane.

In an embodiment, the third monomer C is selected from the group consisting of benzoic acid, 2-methylbenzoic acid, 3-methylbenzoic acid, 4-methylbenzoic acid, 2-methoxybenzoic acid, 3-methoxybenzoic acid and 4-methoxybenzoic acid.

In an embodiment, the hot melt ink further comprises a copolyester from a fifth monomer A' being a polyhydroxyl alcohol comprising X hydroxyl functional groups, wherein X≥3, a sixth monomer C', being an aromatic monocarboxylic acid, and, if X≥4, a seventh monomer D', being an aromatic monocarboxylic acid different from C'.

In an embodiment, the second monomer B is selected from the group consisting of a dicarboxylic acid and an anhydride of a dicarboxylic acid.

In an embodiment, the first monomer A is present in a molar amount $n_A$, the second monomer B is present in a second molar amount $n_B$ and the third monomer C is present in a third molar amount $n_C$, and wherein the following formula is satisfied:

$$0.75 < \frac{X * n_A}{2n_B + n_C} < 1.25.$$

In an alternative embodiment, the second monomer B is selected from the group consisting of a lactone and a hydroxyl carboxylic acid.

In an embodiment, the first monomer A is present in a molar amount $n_A$, the second monomer B is present in a second molar amount $n_B$, $n_B > 0$ mole and the third monomer C is present in a third molar amount $n_C$, and wherein the following formula is satisfied:

$$0.75 < \frac{X * n_A}{n_C} < 1.25$$

In an embodiment, a hot melt ink composition is provided, the hot melt ink composition comprising a copolyester mixture, the copolyester mixture comprising 2 or more of the copolyesters in accordance with the present invention.

In an embodiment, the hot melt ink further comprises a colorant and a high melting crystalline material.

In an aspect of the present invention, a process is provided for preparing a copolyester from at least a first monomer A, said first monomer A being a polyhydroxyl alcohol comprising X hydroxyl functional groups, wherein X≥3, a second monomer B, the second monomer B being selected from the group consisting of a dicarboxylic acid and an anhydride of a dicarboxylic acid and a third monomer C, being an aromatic monocarboxylic acid, said process comprising the steps of:

a) bringing a first molar amount $n_A$ of the first monomer A comprising X hydroxyl functional groups, a second molar amount $n_B$ of the second monomer B and a third molar amount $n_C$ of the third monomer C under an inert atmosphere in a reactor, provided with a Dean Stark unit, in a ratio Q, wherein Q is defined as:

$$\frac{X * n_A}{2n_B + n_C},$$

wherein 0.75<Q<1.25;

b) heating the mixture to 150° C.-250° C., such that the water formed by the condensation reaction is removed from the reaction mixture; and c) after the reaction has completed, removing the solvent by distillation.

In an aspect of the present invention, a process is provided for preparing a copolyester from at least a first monomer A, said first monomer A being a polyhydroxyl alcohol comprising X hydroxyl functional groups, wherein X≥3, a second monomer B, the second monomer B being selected from the group consisting of a lactone and a hydroxyl carboxylic acid and a third monomer C, being an aromatic monocarboxylic acid, said process comprising the steps of:

a) bringing a first molar amount $n_A$ of the first monomer A comprising X hydroxyl functional groups, a second molar amount $n_B$ of the second monomer B, $n_B > 0$ and a third molar amount $n_C$ of the third monomer C under an inert atmosphere in a reactor, provided with a Dean Stark unit, in a ratio Q', wherein Q' is defined as:

$$\frac{X * n_A}{n_C},$$

and wherein 0.75<Q'<1.25;

b) heating the mixture to 150° C.-250° C., such that the water formed by the condensation reaction is removed from the reaction mixture;

c) after the reaction has completed, removing the solvent by distillation.

In an embodiment, the process further comprising the steps of:

d) distilling the copolyester under reduced pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The FIGURE is a schematic representation of an image forming apparatus.

DETAILED DESCRIPTION OF THE PREFERRED EMBODIMENTS

The FIGURE shows an ink jet printing assembly 53. The ink jet printing assembly 53 comprises a support for supporting an image receiving member 52. The support is shown in The FIGURE as a platen 51, but alternatively, the support may be a flat surface. The platen 51, as depicted in The FIGURE, is a rotatable drum, which is rotatable about its axis as indicated by arrow A. The support may be optionally provided with suction holes for holding the image receiving member in a fixed position with respect to the support. The ink jet printing assembly 53 comprises print heads 54a-54d, mounted on a scanning print carriage 55. The scanning print carriage 55 is guided by a suitable guiding mechanism 56, 57 to move in reciprocation in the main scanning direction B. Each print head 54a-54d comprises an orifice surface 59, which orifice surface 59 is provided with at least one orifice 58. The print heads 54a-54d are configured to eject droplets of marking material onto the image receiving member 52. The print heads 54a-54d may be based on a number of techniques to eject droplets. For example, the print heads 54a-54d may be piezoelectric print heads or they may be thermal print heads, for example. The platen 51, the carriage 55 and the print heads 54a-54d are controlled by a suitable controller 60a, 60b and 60c, respectively.

The image receiving member 52 may be a medium in web or in sheet form and may be composed of, e.g. paper, cardboard, label stock, coated paper, plastic or textile. Alternatively, the image receiving member 52 may also be an intermediate member, endless or not. Examples of endless members, which may be moved cyclically, are a belt or a drum. The image receiving member 52 is moved in the sub-scanning direction A by the platen 51 along four print heads 54a-54d provided with a fluid marking material.

A scanning print carriage 55 carries the four print heads 54a-54d and may be moved in reciprocation in the main scanning direction B parallel to the platen 51, such as to enable scanning of the image receiving member 52 in the main scanning direction B. Only four print heads 54a-54d are depicted for demonstrating the present invention. In practice, an arbitrary number of print heads may be employed. In any case, at least one print head 54a-54d per color of marking material is placed on the scanning print carriage 55. For example, for a black-and-white printer, at least one print head 54a-54d, usually containing black marking material is present. Alternatively, a black-and-white printer may comprise a white marking material, which is to be applied on a black image-receiving member 52. For a full-color printer, containing multiple colors, at least one print head 54a-54d for each of the colors, usually black, cyan, magenta and yellow is present. Often, in a full-color printer, black marking material is used more frequently in comparison to differently colored marking material. Therefore, more print heads 54a-54d containing black marking material may be provided on the scanning print carriage 55 compared to print heads 54a-54d containing marking material in any of the other colors. Alternatively, the print head 54a-54d containing black marking material may be larger than any of the print heads 54a-54d, containing a differently colored marking material.

The carriage 55 is guided by guides 56, 57. These guides 56, 57 may be rods as depicted in The FIGURE at "B." The rods may be driven by a suitable driving mechanism (not shown). Alternatively, the carriage 55 may be guided by another guide, such as an arm being able to move the carriage 55. Another alternative is to move the image receiving material 52 in the main scanning direction B.

Each print head 54a-54d comprises an orifice surface 59 having at least one orifice 58, in fluid communication with a pressure chamber containing fluid marking material provided in the print head 54a-54d. On the orifice surface 59, a number of orifices 58 is arranged in a single linear array parallel to the sub-scanning direction A. Eight orifices 58 per print head 54a-54d are depicted in The FIGURE, however obviously in a practical embodiment several hundreds of orifices 58 may be provided per print head 54a-54d, optionally arranged in multiple arrays. As depicted in The FIGURE, the respective print heads 54a-54d are placed parallel to each other such that corresponding orifices 58 of the respective print heads 54a-54d are positioned in-line in the main scanning direction B. This means that a line of image dots in the main scanning direction B may be formed by selectively activating up to four orifices 58, each of them being part of a different print head 54a-54d. This parallel positioning of the print heads 54a-54d with corresponding in-line placement of the orifices 58 is advantageous to increase productivity and/or improve print quality. Alternatively multiple print heads 54a-54d may be placed on the print carriage adjacent to each other such that the orifices 58 of the respective print heads 54a-54d are positioned in a staggered configuration instead of in-line. For instance, this may be done to increase the print resolution or to enlarge the effective print area, which may be addressed in a single scan in the main scanning direction. The image dots are formed by ejecting droplets of marking material from the orifices 58.

Upon ejection of the marking material, some marking material may be spilled and stay on the orifice surface 59 of the print head 54a-54d. The ink present on the orifice surface 59 may negatively influence the ejection of droplets and the placement of these droplets on the image receiving member 52. Therefore, it may be advantageous to remove excess of ink from the orifice surface 59. The excess of ink may be removed for example by wiping with a wiper and/or by application of a suitable anti-wetting property of the surface, e.g. provided by a coating.

EXPERIMENTS AND EXAMPLES

Materials

All chemicals were obtained from Sigma-Aldrich and used as received. The pigment used was a dispersion of carbon black (PB 7).

Methods

Glass Transition Temperature ($T_g$), Melting Point and Crystallization Point

The $T_g$ is determined according to ASTM E 1356-03 with differential scanning calorimetry and measured with a TA instruments Q2000. The prepared sample was heated at a rate of 20° C./min. The onset of the $T_g$ was determined during a second run (i.e. sample was heated and cooled first before starting the measurement). The $T_g$ is a secondary transition and can be determined by analyzing the deflection point of the DSC curve.

The melting points were determined during a first heating run. The crystallization temperatures were determined during a first cooling run.

Viscosity

Viscosity was measured with a HAAKE Rheostress RS 600 rheometer equipped with a HAAKE Universal Temperature Controller using plate-plate geometry sensor system (PP60) at 140° C. (CR Method).

Molecular Weight ($M_n$ and $M_w$)

The number averaged molecular weight and the weight averaged molecular weight of the copolyester were determined with Size Exclusion Chromatography using a mixed C-column. The $M_n$ and $M_w$ are determined relative to a polystyrene standard.

Smearing

Smearing was measured using the following method:
- printing a pattern that corresponds to 8 active nozzles and 24 inactive nozzles at a resolution of 600×600 dpi, comprising 32 bars.
- loading the printed pattern by moving a flat holder having a size of 30 mm*30 mm and a mass of 455 grams, covered in Océ Top Colour Paper Satinated (TCS) to and fro ten times over the printed pattern in a direction perpendicular to the direction of the printed bars.
- the smearing is determined by measuring the optical density of the imprint on the TCS and awarding the results with a mark ranging from 0 to 5. A mark of 0 corresponds to much smearing (bad result) and 5 results to no smearing (good result).

Grey-Area Smearing

Grey area smearing is measured using the following method:
- A scratch is made using a normal force of 10 N on a grey area, printed with 150×150 dpi.
- The relative difference in optical density, OD, (measured with a Gretag Macbeth D19C OD meter) between the surface of the scratch and the area right next to the scratch is measured (($\Delta OD/OD_{area\ right\ next\ to\ the\ scratch}$) *100%).
- The relative OD difference between the surface of the scratch and the area right next to the scratch is a measure of scratch fastness. A relative OD difference of 0% represents no grey-area smearing and is given the value 5. A relative OD difference of more than 40% represents high grey area smearing and is given the value 0.

Blocking

The blocking resistance is determined according to ISO 11798 and comprises the following steps:
- sample preparation: 1) cutting printed sample of a receiving material of 7×7 cm; 2) cutting unprinted sample of a receiving material of the same size; 3) alternatingly stacking printed parts and unprinted parts, such that unprinted receiving material is in direct contact with a printed part; and
- placing a weight of 3.34 kg onto the stack, at 50° C. (unless stated otherwise) and 60% relative humidity for 3.5 days.

For a positive judgment of the test result, i.e. no or little blocking, the printed and unprinted samples may not stick to each other and no image transfer from a printed sample to an unprinted sample may have occurred. The test results are given a mark ranging from 5 (no blocking) to 0 (much blocking).

Scratch Fastness

Scratch fastness was measured using the following method:
- A scratch is made using a normal force of 28 cN with a chisel of polycrystalline diamond with a radius of 0.5 mm.
- The relative difference in optical density, OD, (measured with a Gretag Macbeth D19C OD meter) between the surface of the scratch and the area right next to the scratch is measured (($\Delta OD/OD_{area\ right\ next\ to\ the\ scratch}$)* 100%)
- The relative OD difference between the surface of the scratch and the area right next to the scratch is a measure for scratch fastness.
- A relative OD difference of 0% represents perfect scratch fastness and is given the value 5. A relative OD difference of 20% or more represents very low scratch fastness and is given the value 0.

Adhesion

The adhesion is measured using the ASTM D3359 test.

Folding Resistance

Folding resistance is measured using the following method:
- A printed paper, preferably Hello Gloss 90 grams, is folded using a Kirchner roll. The fold is made perpendicular to the direction of printing.
- The optical density is measured on a position on the printed paper, where the fold is made ($OD_{fold}$) and the optical density is measured on a position on the printed paper next to the fold ($OD_{next\ to\ fold}$).
- Based on the measured optical densities, the folding resistance $\alpha$ is calculated, wherein $\alpha$ is defined as: $\alpha = (10^{-OD\ (fold)}-1)/(10^{-OD\ (next\ to\ fold)}-1)$. When $\alpha=1$ (perfect folding resistance), the results is given the value 5, when $\alpha \leq 0.90$, then the result is given the value 0.

Carbon Effect

Carbon effect was measured using the following method:
- A ballpoint and a metal plate were provided, the point of the ballpoint resting on the metal plate.
- An object having a mass of 296 g was connected to the ballpoint, such that the object is hanging from the ballpoint.
- A printed paper and a non-printed paper, the printed side of the printed paper facing the non-printed paper, the printed paper and the non-printed paper comprising the same type of paper are put on top of one another and are moved in between the ballpoint and the metal plate together, such that the ballpoint draws a line on the backside of the printed paper. The printed and the non-printed paper should not move with respect to one another. The results are judged by comparing the results of the test with references and are given a value. A value of 5 corresponds to a very good result, a value of 0 corresponds to a very bad results.

Experiment 1

Preparation of Copolyester 10.0 g glycerol (0.109 mole; 6 equivalents), 15.6 g cyclohexane-1,2-dicarboxyllic acid (0.091 mole; 5 equivalents) and 17.7 g benzoic acid (0.145 mole; 8 equivalents) was brought under nitrogen atmosphere into a round-bottom flask equipped with a Dean-Stark trap. 20 ml of xylene was added. The mixture was then heated to 200° C. and stirred for 2 days. The conversion was monitored by monitoring the amount of water present in the Dean-Stark trap.

After the reaction was completed, the water was removed from the Dean Stark trap and the xylene was removed in a rotavap. Since xylene forms an azeotropic mixture with water, the last traces of water were also removed upon removal of the xylene. The last traces of xylene as well as unreacted monomer were removed by heating the reaction mixture to 150° C. for another 8 hours under vacuum (i.e. at a pressure of at most $10^{-2}$ mbar).

The prepared copolyester 30 has a Tg of 25° C., a viscosity at 140° C. of 354 mPas and a molecular weight ($M_W$) of 2064 gram/mole (see also table 1).

Several other copolyesters in accordance with the present invention (31-43) were synthesized in a similar way as describes above, by combining the desired amounts of the respective building blocks (A, B, C and optionally $C^2$) into the round-bottom flask equipped with a Dean-Stark trap, in experiment 2-14, respectively. Non-limiting examples of copolyesters in accordance with the present invention are summarized in Table 3.

EXAMPLES

Several ink compositions were prepared. Ink compositions 20-25 comprise a copolyester in accordance with the present invention, whereas ink composition 26 does not comprise a copolyester in accordance with the present invention.

Example 1

Preparation of a Hot Melt Ink Composition (20)

10 grams of the copolyester 30, 30 grams of the copolyester 31, and 10 grams of the low melting crystalline component 10 were combined in a vessel, heated to 150° C. and mixed. Subsequently, 50 grams of the high melting crystalline com-

TABLE 3 copolyesters

| Exp | copolyester | 1$^{st}$ monomer A | 2$^{nd}$ monomer B | 3$^{th}$ monomer C | 4$^{th}$ monomer $C^2$ | ratio A:B:C:$C^2$ | $M_w$ (theoretical) (gram/mole) | η (140° C.) (mPa·s) | Tg (° C.) |
|---|---|---|---|---|---|---|---|---|---|
| 1[1] | 30 | glycerol | cyclohexane-1,2-dicarboxyllic acid | benzoic acid | — | 6:5:8:0 | 2064 | 354 | 25 |
| 2 | 31 | glycerol | cyclohexane-1,2-dicarboxyllic acid | benzoic acid | — | 3:2:5:0 | 1068 | 79 | 13 |
| 3[2] | 32 | glycerol | phthalic anhydride | benzoic acid | — | 6:5:8:0 | 2034 | 457 | 28 |
| 4[3] | 33 | glycerol | phthalic anhydride | benzoic acid | — | 3:2:5:0 | 1056 | 98 | 13 |
| 5 | 34 | pentaerythritol | glutaric acid | benzoic acid | — | 2:1:6:0 | 992 | 90 | 20 |
| 6 | 35 | glycerol | cyclohexane-1,4-dicarboxyllic acid | benzoic acid | — | 3:2:5:0 | 1068 | 104 | 9 |
| 7 | 36 | glycerol | succinic anhydride | benzoic acid | — | 6:5:8:0 | 1794 | 182 | 12 |
| 8 | 37 | glycerol | succinic anhydride | 4-$^{tert}$-butyl-benzoic acid | — | 2:1:4:0 | 906 | 135 | 30 |
| 9 | 38 | glycerol | succinic anhydride | 4-$^{tert}$-butyl-benzoic acid | — | 3:2:5:0 | 1240 | 225 | 28 |
| 10 | 39 | glycerol | succinic anhydride | 4-$^{tert}$-butyl-benzoic acid | — | 4:3:6:0 | 1574 | 342 | 31 |
| 11 | 40 | 2-ethyl-2-(hydroxymethyl)propane-1,3-diol | succinic anhydride | benzoic acid | — | 3:2:5:0 | 1068 | 82 | nd |
| 12[4] | 41 | pentaerythritol | — | benzoic acid | 3-methyl benzoic acid, 4-methyl benzoic acid (1:1) | 3:0:4:8 | 589 | 26 | 12 |
| 13 | 42 | glycerol | lactic acid | benzoic acid | — | 1:15:3:0 | 1484 | 70 | 22 |
| 14 | 43 | glycerol | lactic acid | benzoic acid | — | 1:30:3:0 | 2564 | 180 | 32 | nd: not determined
[1]$M_n$ = 930; $M_w$ = 2760; polydispersity = 3.0
[2]$M_n$ = 870; $M_w$ = 2690; polydispersity = 3.1
[3]$M_n$ = 600; $M_w$ = 1130; polydispersity = 1.9
[4]$M_n$ = 450; $M_w$ = 470; polydispersity = 1.0 ponent 1, n=9, was added under stirring of the mixture. The mixture was stirring until all material was melted.

Subsequently, 2.5 phr of black pigment dispersion was added and the mixture was stirred for another 3 hours. The residual solvent from the dispersion was removed at low pressure. The resulting fluid was filtered over a filter having pores in the range of 0.7-1.2 μm. The filtered ink composition was allowed to cool down to room temperature, after which the ink composition solidified, yielding ink composition 20.

Ink composition 20 has a viscosity η of 19.3 mPa s at 140° C., a Tg of 8° C., melting points at 61° C., 73° C., 93° C. and 129° C. and crystallization temperatures of 61° C. and 109° C.

Example 2

Ink composition 21 was prepared in a procedure similar to the one described in example 1, with the difference that 20 grams of the copolyester 31 and 20 grams of the copolyester 41 were used, instead of 10 grams of the copolyester 30 and 30 grams of the copolyester 31.

Ink composition 21 has a viscosity η of 17.5 mPa s at 140° C., a Tg of 5° C., melting points at 61° C., 73° C., 93° C. and 128° C. and crystallization temperatures of 60° C. and 108° C.

Example 3

Ink composition 22 was prepared in a procedure similar to the one described in example 1, with the difference that instead of 10 grams of the copolyester 30, 10 grams of the copolyester 32 were used.

Ink composition 22 has a viscosity η of 18.9 mPa s at 140° C., a Tg of 2° C., melting points at 61° C., 74° C., 94° C. and 129° C. and crystallization temperatures of 60° C. and 110° C.

Example 4

Ink composition 23 was prepared in a procedure similar to the one described in example 1, with the differences that 10 grams of low melting crystalline component 12, instead of 10 grams of low melting crystalline component 10 were used, that 40 grams of the copolyester 32, instead of 10 grams of the copolyester 30 and 30 grams of the copolyester 31 were used and that 50 grams of 9, n=4 were used instead of 50 grams of high melting crystalline component 1, n=9

Ink composition 23 has a viscosity η of 14.4 mPa s at 140° C., a Tg of 6° C., melting points at 57° C. and 110° C. and crystallization temperatures of 35° C. and 53° C.

Example 5

Ink composition 24 was prepared by combining 50 grams of the copolyester 42 and 50 grams of the high melting crystalline component 5, n=6 in a vessel, heating to 150° C. and mixing. Subsequently, 2.5 phr of black pigment obtained from Mikuni, was added and the mixture was stirred for another 3 hours. The resulting fluid was filtered over a filter having pores in the range of 0.7-1.2 μm. The filtered ink composition was allowed to cool down to room temperature, after which the ink composition solidified, yielding ink composition 24.

Ink composition 24 has a viscosity η of 8.0 mPa s at 140° C., a Tg of 15° C., a melting point of 88° C. and a crystallization temperature of 61° C.

Example 6

Ink composition 25 was prepared in a similar way as ink composition 21, except that component 1, n=8 was used as the high melting crystalline component, instead of high melting crystalline material 1, n=9.

Ink composition 25 has a viscosity η of 18.2 mPa s at 140° C., a Tg of 4° C., melting points at 58° C., 71° C., 91° C. and 128° C. and crystallization temperatures of 58° C. and 112° C.

Comparative Example C1

Ink composition 26 was prepared by combining 40 grams of a copolyester from di-isopropanolamine, succinic acid and benzoic acid, the copolyester having an of 700 gram/mole and 20 grams of the low melting crystalline component 10 in a vessel, heating to 150° C. and mixing. Subsequently, 40 grams of the high melting crystalline component 1, n=9, was added under stirring of the mixture. The mixture was stirring until all material was melted.

Subsequently, 2.4 phr of a dye (Valifast Black 3820), was added and the mixture was stirred for another 3 hours. The resulting fluid was filtered over a filter having pores in the range of 0.7-1.2 μm. The filtered ink composition was allowed to cool down to room temperature, after which the ink composition solidified, yielding ink composition 26.

Ink composition 26 has a viscosity η of 12.2 mPa s at 140° C., a Tg of 4° C., melting points at 58° C., 72° C., 91° C. and 123° C. and crystallization temperatures of 52° C. and 103° C.

Example 7

Printing of the Ink Composition

Prints were made using an Océ-colorwave 600 printer, using the above referenced ink compositions. The ink compositions were supplied to the printer in the solid phase and were melted in the printer.

In a first comparison experiment, prints were made using the Océ Colorwave 600 on Hello Gloss receiving medium. Prints made with ink composition 21 (example 2) were compared to prints made with ink composition 26 (C1) on several aspects of print robustness. The results are summarized in table 4.

TABLE 4

|  | Example 2 (21) | Example 5 (24) | Example 6 (25) | C1 (26) |
|---|---|---|---|---|
| blocking | 4 | 1 | 4 | 2.5 |
| carbon effect | 3 | 5 | not tested | 3 |
| folding resistance | 4.5 | 4 | 4 | 4 |
| adhesion | 4.5 | 1 | 4 | 3 |
| smearing | 2.5 | 2 | 2 | 1 |
| grey area smearing | 4 | 0 | 4.5 | not tested |
| scratch fastness | 5 | 0 | 4 | not tested |

Prints made with ink composition 21, comprising a copolyester in accordance with the present invention show better results than the prints made with ink composition 26 on four aspects of print robustness, namely blocking, folding resistance, adhesion and smearing. Prints made with ink composition 21 and prints made with ink composition 26 showed similar results regarding the carbon effect. Prints made with ink composition 21 showed good and very good results on grey area smearing and scratch fastness, respectively. Prints made with ink composition 26 were not tested on these aspects.

Prints made with ink composition 24 also comprising a copolyester in accordance with the present invention shows better results than the prints made with ink composition 26 on two aspects of print robustness, namely smearing and carbon effect. Prints made with ink composition 24 show a similar folding resistance as prints made with ink composition 26. Regarding grey area smearing and scratch fastness, no comparison is possible. Prints made with ink composition 26 show better results regarding blocking and adhesion than prints made with ink composition 24.

Prints made with ink composition 25, also comprising a copolyester in accordance with the present invention shows better results than the prints made with ink composition 26 on three aspects of print robustness, namely blocking, adhesion and smearing. Prints made with ink composition 25 and prints made with ink composition 26 showed similar results regarding the folding resistance.

Prints made with ink-compositions 25 and 26 were fused after printing. For prints made with ink composition 21, only the prints used in the grey-are smearing test were fused after printing. However, the print robustness does normally increase after fusing. Therefore, print robustness is expected to improve even further after fusing of the prints.

In a second comparison experiment, prints were made using the Océ Colorwave 600 on Hello Gloss. Prints made with ink composition 21 were compared to prints made with ink composition 26 on several aspects of print robustness. All prints were fused after printing.

TABLE 5

|  | Example 1 (20) | C1 (26) |
| --- | --- | --- |
| blocking | 4 | 2.5 |
| carbon effect | 3 | 3 |
| folding resistance | 4.5 | 4 |
| adhesion | 4.5 | 3 |
| scratch fastness | 5 | 2 |
| grey area smearing | 4 | not tested |

The results of the tests regarding the print robustness of both the prints made with the ink composition 20 and prints made with the ink composition 26 are summarized in Table 5. Prints made with ink composition 20 show better results on four aspects of print-robustness (blocking, folding resistance, adhesion and scratch fastness) than prints made with ink composition 26. Prints made with ink composition 20 and 26 show the same result in the test for the carbon effect. Only the grey area smearing of prints made with ink composition 20 was tested, therefore, no comparison between prints made with ink composition 26 can be made for that aspect of print robustness. Prints made with ink composition 20 do not show worse print robustness than prints made with ink composition 26 in any of the tests performed.

In a third comparison experiment, prints made using the Océ Colorwave 600 on Top coated Pro Gloss. Prints made with ink composition 20-23 and 26 were compared regarding their scratch fastness. The scratch height used in the test was 3 mm, resp. 4 mm.

TABLE 6

|  | relative OD difference (scratch height 3 mm, 20 cN) | relative OD difference (scratch height 4 mm, 28 cN) | value (0-5) (scratch height 4 mm, 28 cN) |
| --- | --- | --- | --- |
| Example 1 (20) | <3% | <3% | 5 |
| Example 2 (21) | <3% | <3% | 5 |
| Example 3 (22) | <3% | <3% | 5 |
| Example 4 (23) | 10% | 20% | 0 |
| C1 (26) | 27% | 32% | 0 |

Prints made with ink compositions 20, 21 and 22 showed hardly any difference in optical density (OD) between the surface of the scratch and the area right next to the scratch. As a consequence, these prints have a value 5 for scratch fastness. Prints made with ink compositions 23 and 26 show worse results in scratch fastness; both prints were given the value 0 for scratch fastness. However, the relative difference in OD for prints made with ink composition 23 was less than the relative difference in OD for prints made with ink composition 26. Thus, prints made with ink composition 20-23 showed better results than prints made with ink composition 26.

In a fourth comparison experiment, prints made with ink compositions 20, 21, 22 and 26 using the Océ-Colorwave 600 in 1200×600 dpi were tested with respect to blocking.

TABLE 7

| Media Temperature (° C.) | Example 1 (20) | Example 2 (21) | Example 3 (22) | C1 (26) |
| --- | --- | --- | --- | --- |
| 60 | 2 | 2 | 2 | 1 |
| 65 | 3 | 3 | 3 | not tested |
| 70 | 5 | 5 | 4 | not tested |

Prints made with the ink compositions 21-22, comprising a copolyester in accordance with the present invention, showed a lower level of blocking (higher print robustness) than ink composition 26, not comprising a copolyester in accordance with the present invention at a media temperature of 60° C. The level of blocking of the prints made with ink compositions 20-22 decreased with increasing media temperature.

When hot melt ink compositions comprising a copolyester according to the present invention (example 1-6) are compared to hot melt ink compositions not comprising a copolyester in accordance with the present invention (comparative example C1), it is clear that such inks provide improved print-robustness.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hot melt ink composition comprising:
   a copolyester, the copolyester consisting essentially of a condensation product of a first type of monomer, a second type of monomer, and a third type of monomer,
   wherein the first type of monomer comprises at least one monomer A, said monomer A being a polyhydroxyl alcohol comprising X hydroxyl functional groups, wherein $X \geq 3$,
   wherein the second type of monomer comprises at least one monomer B, said monomer B being a monomer able to form an ester linkage with an alcohol, and
   wherein the third type of monomer comprises at least one monomer C, said monomer C being an aromatic monocarboxylic acid.

2. The hot melt ink composition according to claim 1, wherein the viscosity η of the copolyester at a temperature of 150° C. is less than 400 mPa·s.

3. The hot melt ink composition according to claim 1, wherein the weight averaged molecular weight $M_w$ of the copolyester is 4000 gram/mole or less.

4. The hot melt ink composition according to claim 1, wherein the at least one monomer A is selected from at least one of the group consisting of glycerol, pentaerythritol, 2-(hydroxymethyl)-2-methylpropane-1,3-diol, 2-ethyl-2-(hydroxymethyl)propane-1,3-diol, dipentaerythritol, trimethylolethane, trimethylolpropane, trimethylolbutane and trimethylolpentane.

5. The hot melt ink composition according to claim 1, wherein the at least one monomer C is selected from at least one of the group consisting of benzoic acid, 2-methylbenzoic acid, 3-methylbenzoic acid, 4-methylbenzoic acid, 2-methoxybenzoic acid, 3-methoxybenzoic acid and 4-methoxybenzoic acid.

6. The hot melt ink composition according to claim 1, wherein the hot melt ink composition further comprises a copolyester, the copolyester consisting essentially of a condensation product of the first type of monomer and the third type of monomer, wherein the first type of monomer comprises at least one monomer A', said monomer A' being a polyhydroxyl alcohol comprising X hydroxyl functional groups, wherein $X \geq 3$, and wherein the third type of monomer comprises at least one monomer C', said monomer C' being an aromatic carboxylic acid, and wherein, if $X \geq 4$, the third type of monomer comprises at least two monomers $C^{1\prime}$ and $C^{2\prime}$, said monomers $C^{1\prime}$ and $C^{2\prime}$ being aromatic carboxylic acids, wherein $C^{1\prime}$ is different from and $C^{2\prime}$.

7. The hot melt ink composition according to claim 1, wherein the monomer B is selected from at least one of the group consisting of a dicarboxylic acid and an anhydride of a dicarboxylic acid.

8. The hot melt ink composition according to claim 7, wherein the first type of monomer is present in a first molar amount $n_A$, the second type of monomer is present in a second molar amount $n_B$ and the third type of monomer is present in a third molar amount $n_C$, and wherein the following formula is satisfied:

$$0.75 < \frac{X * n_A}{2n_B + n_C} < 1.25.$$

9. The hot melt ink composition according to claim 1, wherein the monomer B is selected from at least one of the group consisting of a lactone and a hydroxyl carboxylic acid.

10. The hot melt ink composition according to claim 9, wherein the first type of monomer is present in a first molar amount $n_A$, the second type of monomer is present in a second molar amount $n_B$, $n_B > 0$ mole and the third type of monomer is present in a third molar amount $n_C$, and wherein the following formula is satisfied:

$$0.75 < \frac{X * n_A}{n_C} < 1.25.$$

11. A hot melt ink composition, comprising a copolyester mixture, the copolyester mixture comprising 2 or more of the copolyesters according to claim 8.

12. A hot melt ink composition, comprising a copolyester mixture, the copolyester mixture comprising 2 or more of the copolyesters according to claim 10.

13. The hot melt ink composition according to claim 1, wherein the hot melt ink further comprises a colorant and a high melting crystalline material.

14. A process for preparing a copolyester, the copolyester consisting essentially of a condensation product of a first type of monomer, a second type of monomer and a third type of monomer, wherein the first type of monomer comprises at least one monomer A, said monomer A being a polyhydroxyl alcohol comprising X hydroxyl functional groups, wherein $X \geq 3$, wherein the second type of monomer comprises at least one monomer B, said monomer B being selected from the group consisting of a dicarboxylic acid and an anhydride of a dicarboxylic acid, and wherein the third type of monomer comprises at least one monomer C, said monomer C being an aromatic monocarboxylic acids, the process comprising the steps of:
   bringing a first molar amount $n_A$ of the first type of monomer, a second molar amount $n_B$ of the second type of monomer and a third molar amount $n_C$ of the third type of monomer under an inert atmosphere in a reactor, provided with a Dean Stark unit, in a ratio Q, wherein Q is defined as:

$$\frac{X * n_A}{2n_B + n_C},$$

wherein $0.75 < Q < 1.25$;
   heating the mixture to 150° C.-250° C., such that the water formed by the condensation reaction is removed from the reaction mixture; and
   after the reaction has completed, removing the solvent by distillation.

15. A process for preparing a copolyester, the copolyester consisting essentially of a condensation product of a first type of monomer, a second type of monomer and a third type of monomer, wherein the first type of monomer comprises at least one monomer A, said monomer A being a polyhydroxyl alcohol comprising X hydroxyl functional groups, wherein $X \geq 3$, wherein the second type of monomer comprises at least one monomer B, said monomer B being selected from the group consisting of a lactone and a hydroxyl carboxylic acid, and wherein the third type of monomer comprises at least one monomer C, said monomer C being an aromatic monocarboxylic acid, the process comprising the steps of:
   bringing a first molar amount $n_A$ of the first type of monomer, a second molar amount $n_B$ of the second type of monomer, $n_B > 0$ and a third molar amount $n_C$ of the third type of monomer under an inert atmosphere in a reactor, provided with a Dean Stark unit, in a ratio Q', wherein Q' is defined as:

$$\frac{X*n_A}{n_C},$$

and wherein $0.75<Q'<1.25$;

heating the mixture to 150° C.-250° C., such that the water formed by the condensation reaction is removed from the reaction mixture; and after the reaction has completed, removing the solvent by distillation.

16. The process according to claim 14, further comprising the step of distilling the copolyester under reduced pressure.

17. The process according to claim 15, further comprising the step of distilling the copolyester under reduced pressure.

* * * * *